United States Patent [19]

Cowen et al.

[11] 4,207,278
[45] Jun. 10, 1980

[54] METHOD FOR PREPARING A COMPOSITE FOAMED RESIN ARTICLE HAVING A METALLIC LAYER

[75] Inventors: Geoffrey Cowen; Philip Norton-Berry; Margaret L. Steel, all of Runcorn, England

[73] Assignee: Imperial Chemical Industries Limited, London, England

[21] Appl. No.: 844,387

[22] Filed: Oct. 21, 1977

[30] Foreign Application Priority Data

Oct. 26, 1976 [GB] United Kingdom ............... 44409/76

[51] Int. Cl.² ............................................. B29D 27/04
[52] U.S. Cl. .................................. 264/46.4; 264/46.6; 264/46.8; 264/266; 264/267; 264/316
[58] Field of Search .................. 264/46.5, 46.7, 46.8, 264/131, 266, 267, 316; 428/313, 511

[56] References Cited

U.S. PATENT DOCUMENTS

| | | | |
|---|---|---|---|
| 2,556,504 | 6/1951 | Prestwich | 264/131 X |
| 2,976,577 | 3/1961 | Gould | 264/46.8 X |
| 3,111,569 | 11/1963 | Rubenstein | 264/46.7 X |
| 3,163,686 | 12/1964 | Dusel et al. | 264/46.8 X |
| 3,187,069 | 6/1965 | Pincus et al. | 264/46.8 |
| 3,267,484 | 8/1966 | Roedder | 264/46.6 X |
| 3,383,152 | 5/1968 | Ward | 264/46.5 X |
| 3,505,436 | 4/1970 | Krug et al. | 264/46.8 |
| 3,535,179 | 10/1970 | Dryden | 264/46.7 X |
| 3,634,565 | 1/1972 | Schaerer | 264/46.7 X |
| 3,647,588 | 3/1972 | Greig | 428/313 X |
| 3,949,139 | 4/1976 | Dunning et al. | 428/511 X |

FOREIGN PATENT DOCUMENTS

| | | |
|---|---|---|
| 2147510 | 3/1972 | Fed. Rep. of Germany . |
| 2626740 | 2/1977 | Fed. Rep. of Germany . |
| 46-17076 | 5/1971 | Japan ................ 264/131 |
| 289307 | 7/1953 | Switzerland . |
| 760684 | 11/1956 | United Kingdom ........ 264/131 |
| 1031301 | 6/1966 | United Kingdom . |
| 1275555 | 5/1972 | United Kingdom . |
| 1372237 | 10/1974 | United Kingdom . |

*Primary Examiner*—Philip Anderson
*Attorney, Agent, or Firm*—Cushman, Darby & Cushman

[57] ABSTRACT

A method for the preparation of composite products wherein a foam expands in contact with a laminated sheet, one of the layers of which is metallic, the pressure generated during expansion of a foam forces the laminated sheet to adopt a desired configuration and the foam adheres to the laminated sheet. Composite products having a mirror-like appearance may be prepared by the method.

15 Claims, 4 Drawing Figures

METHOD FOR PREPARING A COMPOSITE FOAMED RESIN ARTICLE HAVING A METALLIC LAYER

This invention relates to a method for the preparation of composite products, particularly to a method for the preparation of composite products having a non-planar surface, and to the products of such a method.

The present invention provides a method for the preparation of composite products comprising a laminated sheet and a foam backing adhering thereto, the laminated sheet forming at least part of a non-planar surface of the composite product, which method comprises allowing or causing the foam, or a precursor therefor, to expand in contact with the laminated sheet such that the foam adheres to the laminated sheet and forms a backing therefor, and such that the pressure generated during expansion of the foam forces the laminated sheet into a non-planar configuration.

A further embodiment of the invention provides composite products comprising a laminated sheet and a foam backing adhering thereto, the laminated sheet forming at least part of a non-planar surface of the composite product.

By laminated sheet we mean a sheet comprising a plurality of layers, adjacent layers being adhesively or mechanically bonded to each other, the thickness of each layer being less than its other two dimensions and at least one of the layers being metallic. Where the laminated sheet comprises more than two layers it is often preferred that the metallic layer forms an outer layer of the laminated sheet. Preferably the laminated sheet consists of a metallic layer and a non-metallic layer.

The contours of the said non-planar surface may be regular or irregular, they may be simple, i.e. all the contour lines are straight lines, or they may be complicated i.e. at least a portion of the contour lines are curved. Conveniently the said contours are generated by effecting the method of the invention in a mould.

It will be appreciated that the laminated sheet may contact more than one surface of the foam. Thus a composite product may be formed in which, for example two or more surfaces, e.g. two opposing surfaces, of the product comprise a laminated sheet. Preferably, where two such opposing surfaces are so covered, discrete laminated sheets are employed for each surface although we do not exclude the possibility that one laminated sheet forms two opposed surfaces fo the product or parts of two such surfaces, or possibly three or more surfaces.

The composite product may be of any configuration, shape size etc. as may be convenient, it will often be in the form of a sheet of a thickness less than the two other dimensions. Typically the thickness of the composite product is between 0.5 cm and 15 cm, although it will be appreciated that the thickness and other dimensions may vary between wide limits, e.g. limit on thickness is imposed by the other dimensions and the need for it not to break if unsupported. The composite product may be thicker in one part than in another.

In a preferred embodiment of the method of the invention, the pressure generated during the expansion of the foam extends at least a proportion of the laminated sheet to increase the surface area thereof. The laminated sheet may be extended over its total area, e.g. the laminated sheet may form a convex or concave surface of the composite product, or a discrete area or areas of the laminted sheet may be extended, e.g. the laminated sheet may form a pitted surface of the composite product. Where discrete areas of the laminated sheet are extended the discrete areas may be randomly or regularly distributed over the laminated sheet.

Techniques for preparing laminated sheets are well known in the art, e.g. the metallic layer may be adhesively bonded to the non-metallic layer; preferably however the metallic layer is deposited on the non-metallic layer with the generation of at least some mechanical bonding between the metallic layer and the non-metallic layer, e.g. by electroplating, chemical deposition or vacuum evaporation.

Materials from which the non-metallic layer employed in the method of the invention may be prepared include glasses, wood, paper, woven and non-woven fabrics, natural and synthetic rubber, polymeric foams, thermoplastic materials such as polystyrene, cellulosics, acrylonitrile-butadiene-styrene, polyolefins, polymethacrylates, polycarbonates, polysulphones, polyvinyl chloride, polyamides, polyesters and thermosetting resins such as sheet moulding compounds or partially cured or B-stage thermosetting resin, e.g. unsaturated polyesters, polyurethanes and epoxy resins and the partially cured sheet materials having a matrix formed by gel polymerisation of mixtures of the precursors of polyurethane and of unsaturated polyester resins disclosed in our U.K. Patent Specification Nos. 1,272,984, 1,279,673 and 1,393,782. Thermoplastics are particularly preferred since they are often readily deformable under the conditions of temperature and pressure generated during the foam expansion process. The non-metallic layer may be reinforced with a reinforcing material e.g. where the non-metallic layer is a thermoplastic it may be reinforced with a fibrous material. This fibrous reinforcement, may be for example, polyester, e.g. polyethylene terephthalate, polyamide e.g. "Nylon", glass or carbon fibre. Where the non-metallic layer is a thermoplastic, fillers and dyes also may be incorporated in it e.g. to increase the density or opacity, or to impart colour. Inorganic powders and particulate pigments are examples of fillers for such an application.

Preferably the laminated sheet is flexible at ambient temperature, although we do not exclude the possibility that a non-flexible laminated sheet may be employed, in which case it needs to be rendered at least temporarily flexible so that it may attain its final non-planar form. Such temporary flexibility may be obtained for example by the application of heat or a solvent to the laminated sheet. Selection of the appropriate flexibilising technique will be made in the light of the chemical and physical characteristics of the non-metallic layer of the foam and, where a mould is employed, possibly also of the material of the mould. Choice of suitable flexibilising conditions will present no problem to the skilled man, for example an appropriate temperature or solvent may be readily determined by experiment. Where the non-metallic layer is in contact with the foam, preferably a solvent, if used to flexibilise the non-metallic layer, will not attack or react adversely with the foam (if it should need to contact it) but wi do not exclude the possibility that some reaction may occur where this is not harmful or possibly is advantageous; for example the solvent may be used to render the foam tacky to facilitate adhesion of the foam to the non-metallic layer. Where the foam expands with generation of heat we have found that the heat generated during the foam expansion process may be used to bring about at least some softening of the laminated sheet.

Particularly preferably the laminated sheet is extensible such that at least a proportion of it may be extended by the pressure generated during expansion of the foam. If an inextensible laminated sheet is used sufficient material must be present to adopt the desired contours. Furthermore, if an inextensible laminated sheet is employed, only contours of relatively simple profile e.g. corrugations, can be produced without creasing the laminated sheet material.

The non-metallic layer may comprise a so-called prepolymer which can be formed to the desired shape and then polymerisation completed to give the fully cross-linked final product. Typical prepolymers are those disclosed in our U.K. Patent Specification Nos. 1,272,984, 1,279,673 and 1,393,782.

The foam employed may be flexible or rigid and where it is flexible we prefer that if the laminated sheet is softened to effect deformation, or if polymerisation of the non-metallic layer is effected while deformation is occurring or after it has occurred, the laminated sheet becomes rigid before the product is removed from the mould.

The thickness of the non-metallic layer employed may be between 5 A° and 10 cms; typically it is between 50 A° and 1 cm; usually it will be between 200 A° and 2 mm thick. Where the non-metallic layer is extended by the foam, the thickness of the non-metallic layer will generally, though not necessarily, be chosen so that there is sufficient material to cover a substantial portion of one surface of the foam, although we do not exclude the possibility that apertures may occur, or may be formed in the non-metallic layer during deformation, through which apertures a portion of the foam may protrude. Where the non-metallic layer is a thermoplastic film the depth of contours into which the thermoplastic film may be forced will depend inter alia on the orientation of the film. Thus biaxially orientated polyethylene terephthalate film will not withstand as high a degree of deformation as will unorientated polyethylene terephthalate film. Typical values of thickness for polyethylene terephthalate film are 0.006 mm to 2 mm. Polyethylene film will withstand a higher degree of deformation and typical values of thickness are 0.001 mm to 3 mm. Typical values of thickness for glass sheet are 0.01 mm to 2 mm although it will be appreciated that only simple contours may be formed. Simple experiment will readily reveal an appropriate thickness of sheet for any particular depth of contour.

Metals which may be employed as the metallic layer in the invention include inter alia, gold, silver, nickel, chromium, aluminium, copper and stainless steel and alloys of these metals. Aluminium is often employed because of its availability, ease of deposition, and high reflectance. Any desired thickness of metal may be employed providing it does not prevent deformation of the laminated sheet, although for economic reasons the minimum thickness to give a desired effect is often preferred. Typically metallic layers between 20 A° and 1μ in thickness are employed.

Foams which may be employed in the present invention include inter alia, rubber latex, polyurethane, polystyrene, phenol formaldehyde, polyvinyl chloride, polyethylene, epoxies and silicones. Expandable preformed foam, e.g. in the form of granules or beads may be employed. Preferably however, a foam precursor is employed since these often facilitate bonding of the foam to the laminated sheet.

Particularly preferably polyurethane foam precursors are employed and more particularly preferably the formed polyurethane is non-flexible.

Choice of suitable foam will be made in the light of the properties required in the product, e.g. the level of insulation, the aesthetic appeal of the product, the heat/pressure required to deform the laminated sheet, the mechanical properties of the foam, e.g. its impact resistance, its cost and ease of application, and selection of an appropriate foam will present no difficulty to the skilled man.

While a mould will usually be employed in the method of the present invention, it is not essential. Where a mould is employed it will provide or be provided with at least one non-planar surface to give a non-planar product. Where a mould is employed a box mould of appropriate dimensions and configuration is preferred. Where a mould is employed, the laminated sheet is preferably forced to adopt at least a proportion of the contours of the mould.

In a very simple embodiment, for example, we have employed a box mould, and by disposing a variety of objects in the mould we have provided means to define the contours to which the laminated sheet will approximately conform and quite complicated patterns have been developed thereby. Objects which may be used include inter alia bottle caps, ball bearings, stone chippings and gear wheels. By choice of appropriate objects a variety of desired patterns can be produced, and as they may be removed easily different patterns may be obtained quite conveniently. Alternatively jets may be provided whereby fluid, e.g. compressed air or water, may be directed against the laminated sheet; as the foam expands and forces the laminated sheet against the jets, depressions are formed in the composite product where the jets impinge on the laminated sheet. Where a mould is employed in the method of the invention, the surface of the mould which the laminated sheet contacts may be cooled, for example, by the provision of tubes in the walls of the mould through which a cooling fluid, e.g. water, may be passed. This often produces a layer of collapsed foam adjacent to the laminated sheet which improves adhesion between the laminated sheet and the foam and increases the impact resistance of the product.

The pressure generated during the foam expansion process may be between 2 and 1000 psi; typically it is between 20 and 250 psi. Where a mould is employed, a partial vacuum e.g. of the order of a few hundred millimeters of mercury, may be applied to the mould side of the laminated sheet prior to the foam expansion process to hold the laminated sheet in position.

The choice of level of pressure of the vacuum, where it is employed, will depend on the particular set of conditions prevailing, and will present no problem to the skilled man. Factors which affect the choice include the deformability of the sheet, and the number, size, and shape of the contours of the mould.

The metallic layer may form the outer surface of a composite product prepared by the method of the present invention or it may be disposed between the foam and the non-metallic layer of a composite product prepared by the method of the present invention. Where the metallic layer is disposed between the foam and the non-metallic layer it may provide the composite product with advantageous electrical or conductivity properties. Where the metallic layer is disposed between the foam and a transparent non-metallic layer the composite product often has a metallic reflecting appearance and may be used for exterior body parts for the automobile industry or for shatter-proof mirrors. Preferably the transparent non-metallic layer is a thermoplastic film which provides a tough protective coating for the product and may protect the metal layer of the composite product from scratches and atmospheric attack. Alternatively a composite product having a metallic reflecting appearance may be prepared by allowing or causing the foam to expand whilst in contact with the non-metallic layer or by allowing or causing the foam to expand whilst in contact with the metallic layer and subsequently removing the non-metallic layer.

Where the metallic layer forms the surface of a composite product prepared by the method of the invention, a transparent coating may be applied to the metallic layer to improve the aesthetic appeal and/or insulating properties and/or life of the composite product.

Where a composite product according to the invention has a metallic layer disposed between the foam and a carrier sheet, the metallic layer preferably comprises discrete particles of metal such that the foam may contact the carrier sheet between the particles to improve bonding between the foam and the laminated sheet. For example, where the non-metallic layer is a polyester film between ⅓ and ¾ of a surface of the polyester film is in contact with metal particles; where a smaller area of the thermoplastic film is in contact with metal particles, the reflectance of the composite product may not be adequate; where a larger area of the thermoplastic film is in contact with metal particles the adhesion of the foam to the laminated sheet may not be sufficiently improved. Methods for depositing discrete particles of metal on a thermoplastic film are well known in art. Any suitable technique may be used, vacuum deposition being conveniently employed.

Where a composite product according to the invention has a metallic layer disposed between the foam and a transparent non-metallic layer, dyes or pigments may be incorporated in the non-metallic layer to alter the radiation absorbance of the composite product.

Where a thermoplastic film is employed, it is particularly surprising, in view of the different shrinkage rates of metals and polymeric materials and the different amounts by which each will shrink, for example during the cooling step after foam function, and the different extensibilities of metals and polymeric materials that the products recovered from the mould often have coatings of thermoplastic film which are free from wrinkles and distortions.

The invention will be further described by reference to the accompanying drawings which show, by way of example only, one embodiment of the method of the invention.

Figure 1:
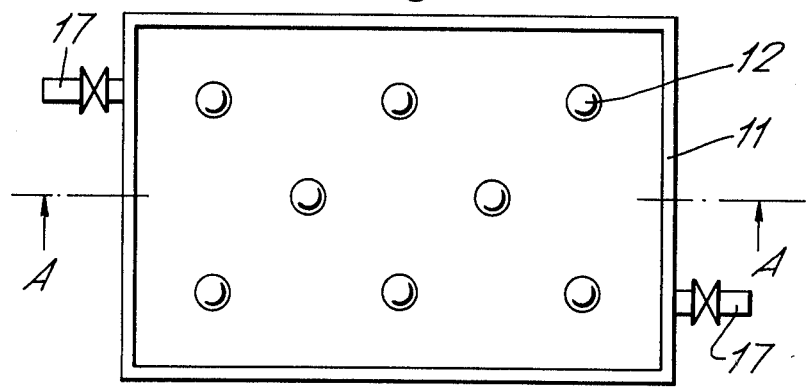
FIG. 1 is a plan view of a mould containing metal spheres.
Figure 2:
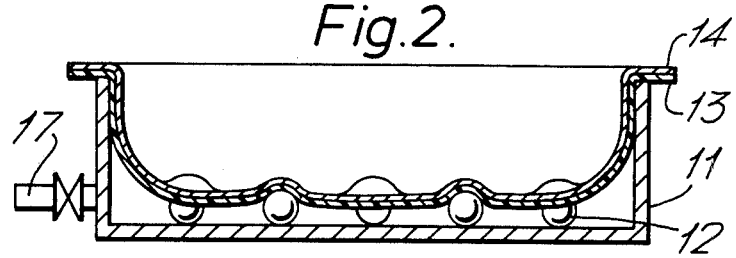
FIG. 2 is a vertical section of the line AA of the mould shown in FIG. 1 with a sheet of aluminised polyethylene terephthalate draped over the spheres and the mould.
Figure 3:
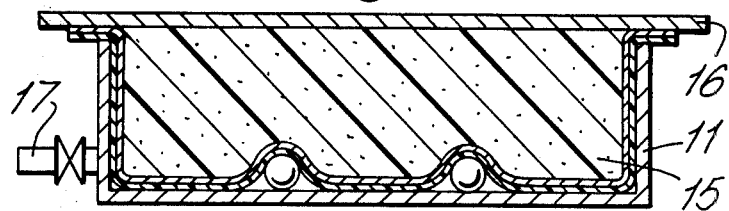
FIG. 3 is a vertical section on the line AA of the mould shown in FIG. 1 containing a foam.
Figure 4:
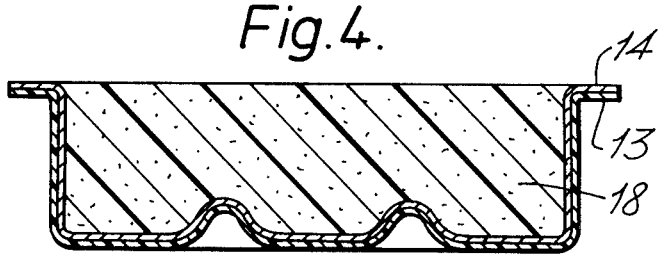
FIG. 4 is a vertical section of a composite product prepared by a method according to the invention.

Eight steel spheres (12) (0.5 cm diameter) were distributed in a rectangular steel mould (11) as shown in FIG. 1. A film of polyethylene terephthalate (13) having an aluminium coating (14) prepared by vacuum deposition of the aluminium onto the film of polyethylene terephthalate was draped over the spheres and the mould as shown in FIG. 2. Vacuum was applied via the vents (17) to hold the film of polyethylene terephthalate in place. A polyurethane foam formulation (15) prepared from 800 gms of a mixture of polyols (70% oxypropylated trimethylolpropane having an OH value of 530 and 30% of a polyester having an OH value of 360), 1000 gms of 4,4'-diisocyanato-diphenylmethane (92% pure; isocyanate content 30.9) and 50 gms of Arcton 11 as blowing agent was poured into the mould and the lid (16), coated with a mould release agent, was clamped in place. As the foam expanded, air was expelled through the vents (17) and the metallised film was extended between the steel spheres until the mould was filled as shown in FIG. 3. The mould was allowed to cool and after 45 minutes the lid (16) was removed and the composite product (18) shown in FIG. 4 was recovered.

In a second run in which forced cooling was employed, by directing a jet of water onto the mould, it was possible to recover the product after approximately 10 minutes.

What we claim is:

1. A method for the preparation of composite products comprising a laminated sheet and a foam backing adhering thereto, the laminated sheet consists of adjacent layers being adhesively or mechanically bonded to each other, and forming at least part of a non-planar surface of the composite product, one of the said layers being a metallic layer wherein the metal is selected from the group consisting of aluminum, gold, silver, nickel, chromium, copper, stainless steel and an alloy of said metal, and the other layer being a film of a thermoplastic material, which method comprises expanding the foam, or a precursor therefor, in contact with the laminated sheet such that the foam adheres to the laminated sheet and forms a backing therefor and such that the pressure generated during expansion of the foam extends at least at proportion of the laminated sheet and forces it into a desired shape, wherein the metallic layer has a thickness between 20 A° and 1μ and is in the form of discrete particles.

2. A method as claimed in claim 1 wherein between ⅓ and ¾ of a surface of the film of thermoplastic material is in contact with the metal particles.

3. A method as claimed in claim 1 wherein the thermoplastic material is polyethylene terephthalate.

4. A method as claimed in claim 1 wherein the said metal is aluminum.

5. A method as claimed in claim 1 wherein the laminated sheet is forced to adopt at least a proportion of the contours of a mould.

6. A method as claimed in claim 5 whrein a vacuum is applied to the mould to hold the laminated sheet in position prior to contacting the laminated sheet with the expanding foam.

7. A method as claimed in claim 5 wherein the surface of the mould into which the laminated sheet is to be forced into contact therewith is cooled.

8. A method as claimed in claim 1 wherein the laminated sheet is flexible at ambient temperature.

9. A method as claimed in claim 1 wherein the laminated sheet is extensible at ambient temperature.

10. A method as claimed in claim 1 wherein the said film is transparent.

11. A method as claimed in claim 1 wherein the thermoplastic material is a polyester.

12. A method as claimed in claim 11 wherein the polyester is polyethylene terephthalate.

13. A method as claimed in claim 12 wherein the metallic layer is in the form of discrete aluminium particles and between ⅛ and ¾ of a surface of the polyethylene terephthalate film is in contact with the aluminium particles.

14. A method as claimed in claim 1 wherein a polyurethane foam precursor is expanded.

15. A method as claimed in claim 13 wherein the polyurethane is non-flexible.

* * * * *